US008832783B2

(12) United States Patent
Ben-Shalom et al.

(10) Patent No.: US 8,832,783 B2
(45) Date of Patent: Sep. 9, 2014

(54) SYSTEM AND METHOD FOR PERFORMING SECURE COMMUNICATIONS

(71) Applicant: Intel Corporation, Santa Clara, CA (US)

(72) Inventors: Omer Ben-Shalom, Rishon Le-Tzion (IL); Alex Nayshtut, Gan Yavne (IL); Edward V. Jimison, Folsom, CA (US); Avigdor Eldar, Jerusalem (IL); Adi Shaliv, Nir-Banim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/631,080

(22) Filed: Sep. 28, 2012

(65) Prior Publication Data

US 2014/0096179 A1    Apr. 3, 2014

(51) Int. Cl.
*G06F 17/00*    (2006.01)
*H04L 29/06*    (2006.01)

(52) U.S. Cl.
CPC .................................... *H04L 63/061* (2013.01)
USPC .................................... 726/1; 709/227; 726/5

(58) Field of Classification Search
CPC .......... H04M 1/7253; H04M 2250/02; H04M 2250/04; H04M 1/6066; H04W 4/008; H04W 12/04; H04W 12/06; H04B 5/00; H04B 5/0062; H04B 5/02; H04B 5/0031; H04L 2209/80; H04L 9/0844; H04L 63/061
See application file for complete search history.

(56) References Cited

U.S. PATENT DOCUMENTS

| 8,271,662 | B1* | 9/2012 | Gossweiler et al. | 709/227 |
|---|---|---|---|---|
| 2007/0005963 | A1* | 1/2007 | Eldar et al. | 713/168 |
| 2010/0088237 | A1* | 4/2010 | Wankmueller | 705/75 |
| 2012/0051546 | A1* | 3/2012 | Tsurumoto | 380/270 |
| 2012/0132758 | A1* | 5/2012 | Ashraf et al. | 246/114 R |

* cited by examiner

*Primary Examiner* — Nirav B Patel
*Assistant Examiner* — Mohammed Waliullah
(74) *Attorney, Agent, or Firm* — KED & Associates

(57) ABSTRACT

A system establishes secure communications between first and second electronic devices. The first device stores secured content to be accessed by second device based on identification information of the first device. The identification information of the first device may be manually input into the second device, and the second device may perform an initial pairing operation with the first device based on this manually entered information. The identification information stored from initial pairing may allow secure automatic pairing.

20 Claims, 7 Drawing Sheets

SYSTEM AND METHOD FOR PERFORMING SECURE COMMUNICATIONS

FIELD

One or more embodiments herein relate to providing secure communications.

BACKGROUND

Instituting protections against the unauthorized access of information continues to be a focus among providers of information terminals and other forms of electronic devices. During use of these terminals, the exchange information is often required or intended. In order to protect the integrity of the terminals and the information stored therein, security measures have been programmed into the operating system software. This approach, however, is susceptible to corruption from malware and other viruses and also allows the stored information to be accessed by hackers and other unauthorized users.

DETAILED DESCRIPTION

Figure 1:
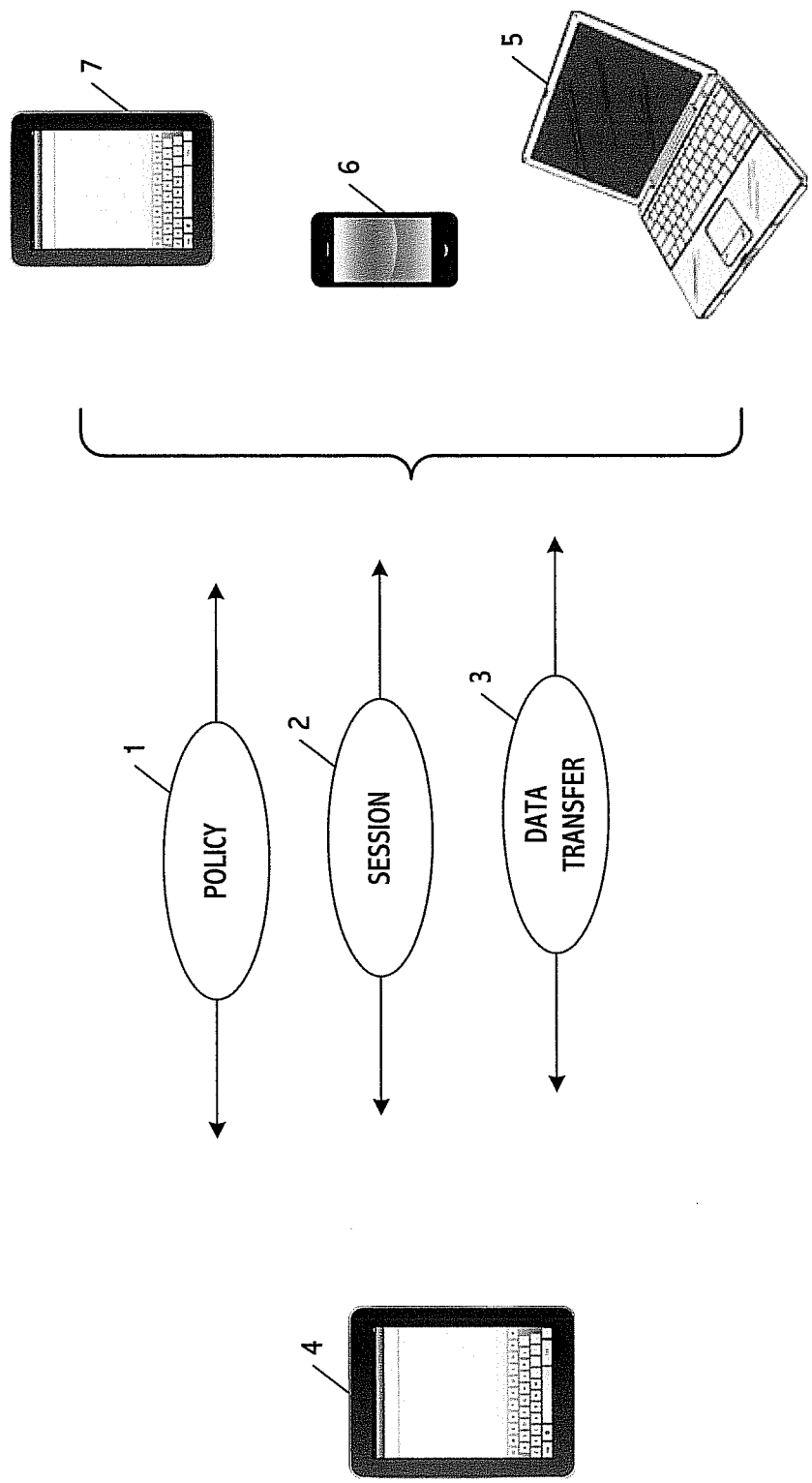
FIG. 1 shows a method for establishing secure communications between devices.

FIG. 1 shows conceptually one embodiment of a method for establishing secure communications between two electronic devices. In one implementation, the method may establish an ad hoc peer-to-peer communications between the devices. The electronic devices may be a smart phone, tablet, pod- or pad-type device, notebook or other form of personal computer, navigation system, gaming system, electronic camera or camcorder, media player, personal digital assistant, or other types of mobile, transportable, or stationary electronic devices equipped to exchange, transfer, or receive data.

The data may include image, video or other types of media files, documents and contact information as well as other forms of digital content, and the data may be exchanged through any one of a variety of wireless or wired connections. Examples of wireless connections include short-range connections including Bluetooth, Wireless Fidelity (WiFi), Wireless Display (WiDi), and 60 GHz links and longer-range connections including through a cellular, satellite or mobile network, and examples of wired connections include a Universal Serial Bus (USB), Firewire and other hard-wired interfaces.

Referring to FIG. 1, the method may be implemented in three stages: a policy stage 1, a session establish stage 2, and a data transfer stage 3. During the policy stage, a policy is checked to determine whether the exchange of secure information and/or data is permissible between devices. In this example, a first device is shown as a tablet 4 and the second device may one or more of a notebook computer 5, a mobile or smart phone 6, and a navigation system 7.

The policy may be checked by one of the devices or both devices. In accordance with one example, the policy may correspond to permissions, conditions and/or other information that defines the conditions under which an associated device may be connected to another device and/or whether an exchange of security, data and/or other information can take place between the devices. In one context, the policy information may relate to password legitimacy, log-on conditions and permissions, file access restrictions, financial transactions, and website or server connectivity. The policy may be programmed, for example, into the operating system software or other control code of one or more of the devices.

The session establish stage is implemented after a determination is made that the policy allows the exchange of secure information and/or data is permissible between the devices. During the session establish stage, the devices are connected and a secure session is established using an available or supported connectivity method and/or session management software. The session management software may or may not be implemented by the operating system of the initiating device.

During the session establishment, identification (e.g., password, log-in, or other access) information of a first device is manually entered on a second device by a user of the second device. In one non-limiting embodiment, the manual entry may be performed using a secure input/output (I/O) technique in order to require physical user presence and to increase security. Physical user presence prevents malware to succeed in session establishment The identification information may be used for authentication of pairing the devices and may allow access to resources of the second device according to the policy. In one embodiment, the identification information may allow for full access to the second device. In another embodiment, the identification information may only allow access to the resources of the second device.

The requirement of manually entering this information provides an additional layer of security and also allows for a subsequent auto-pairing function to be performed between the devices. Once the identification information is entered, the second device stores the information in the storage area of a hardware platform.

The hardware platform may be different from the central processing unit executing the operating system software. In one embodiment, the platform of the second device implements a security engine that stores the identification information of the first device in a predetermined storage area of or coupled to the platform. Use of this security engine allows subsequent automatic pairing between the first and second devices to take place without substantial involvement of the operating system of the second device. This may provide an enhanced level of security against malware, worms, trojans, viruses and/or other forms of malicious code that tend to attack or otherwise manipulate the operating system.

More specifically, by performing subsequent pairing between the first and second devices using the platform security engine (instead of the CPU-implemented operating system) and the stored identification information, malware corruption and/or unauthorized access to data in the first device may be prevented with a greater level of assurance.

After the identification information of the first device has been stored in the second device, the session may proceed by exchanging additional security information including but not limited to secure certificate information. The certificate information may relate to one or more public and/or private keys according to various types of encryption schemes. The additional security information may be stored, for example, for access by the security engine on the hardware platform in performing subsequent auto-pairing between the devices.

In the foregoing description, the second device is described as storing the identification information of the first device. In another embodiment, the first device may also store the identification (e.g., password, log-in, or other access) information of the second device. The first device may store the identification information of the second device in a hardware platform similar to the hardware platform in the second device, e.g., in a storage area for use by a security engine stored off-chip relative to the CPU executing the operating system of the first device.

Also, the identification information of the second device may be manually entered into the first device and stored for auto-pairing between the devices. After this information is entered and stored, additional security information (e.g., certificates, keys, etc.) of the second device may be transferred to the first device during the session for use in auto-pairing. Other examples of establishing a session are discussed in relation to embodiments that follow.

The security, identification and other information stored and exchanged during the session establish stage allows a trust relationship to be established between the first and second devices. To reflect this trust relationship, the policy information of the device(s) receiving the information is updated in order to allow automatic pairing to be subsequently performed between the devices, according to either a bi-directional scheme or a one-way scheme (which occurs when only one of the devices receives the security information of the other device).

The data transfer stage follows the session establish stage and allows data to be transferred between the first and second devices. Transfer of this data may now take place within the secure and trusted connection created during the session establish stage. Transfer of this data may take place through one or both operating systems of the devices. The data may include text, graphics, or media files, contact information, or any other information depending on the type of devices that are connected.

Figure 2:
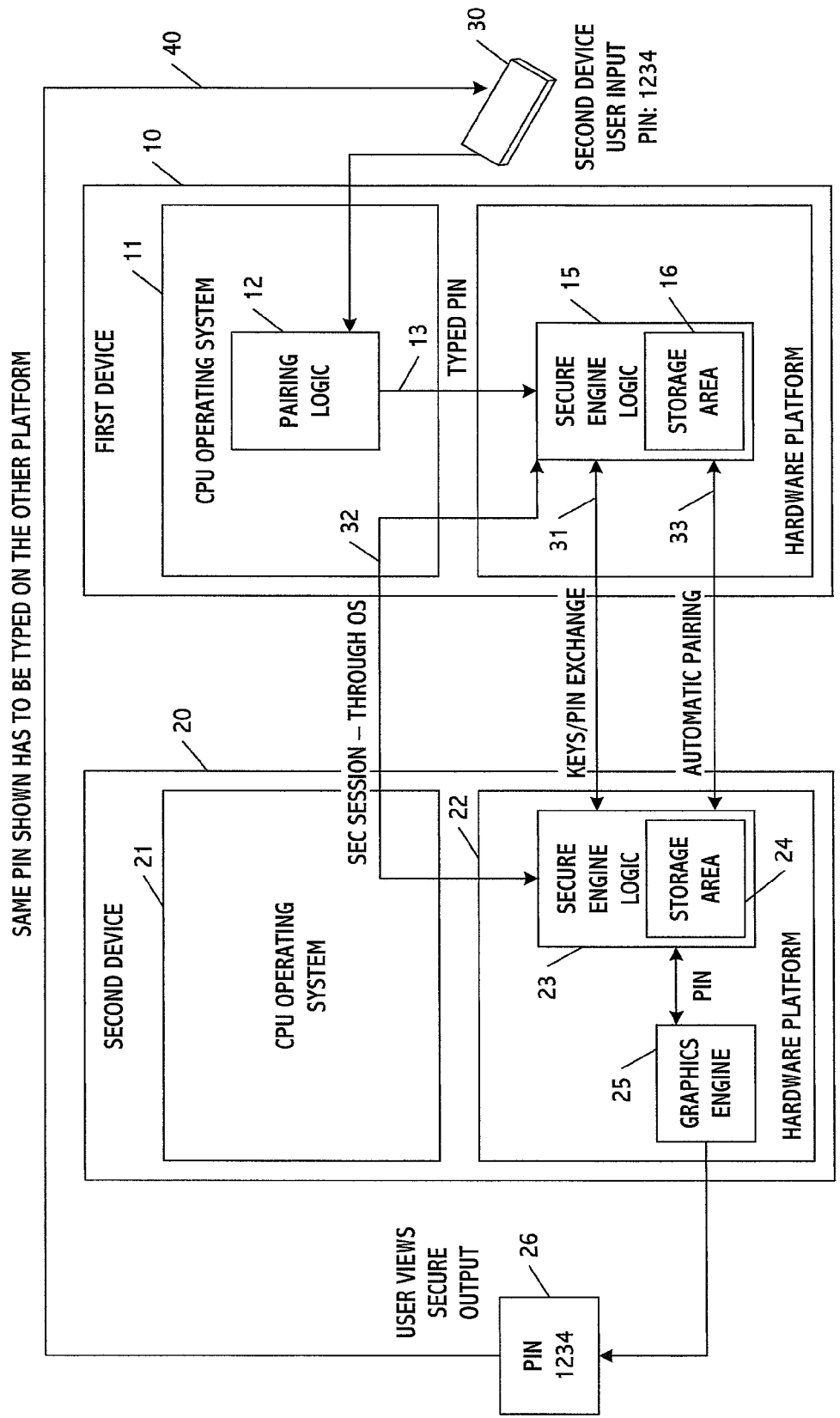
FIG. 2 shows an apparatus for establishing a secure link between two devices.

FIG. 2 shows one embodiment of an apparatus for forming secure communication between two devices. The devices may be any of those previously discussed, and in this embodiment only the first device receives identification information of the second device.

As shown in FIG. 2, the apparatus is located within or coupled to a first device 10 for establishing secure communications with a second device 20. The apparatus in the first device includes first logic 12 located within or implemented by an operating system of the first device, as expected by a central processing unit (CPU). The first logic may be implemented in software (e.g., as part of the operating system software), hardware or a combination of both. The first logic performs the operations of receiving identification information of the second device and then transferring that information to a hardware platform 14 through one or more signal lines 13.

The hardware platform 14 includes secure engine logic 15 which includes or is coupled to a storage area 16 for storing the identification information of the second device transferred from the CPU operating system. The secure engine logic 15 may be implemented by a processor on the hardware platform executing predetermined instructions for establishing secure communications between the first and second devices based on information in the storage area.

In accordance with one embodiment, storage area stores the identification information received from the second device. This information may include a password, log-in information, or other access information of the second device. This information may be used, for example, to authenticate the pairing between the devices and allow access to resources on the other device based on the policy. The storage area may also store additional security information for establishing a session with the second device. As previously indicated, the security information may include one or more public or private keys, certificate information or other information required to establishing secured communications between the first and second devices.

The hardware platform may establish a secure communication link with the second device through a signal line that bypasses the CPU operating system. As shown in FIG. 2, this link may be established between the secure engine logic 15 and the second device. A subsequent automatic pairing operation performed between the devices may also be performed between the secure engine logic and the second device, bypassing the CPU operating system. An example of how this is performed will be discussed in detail below. In another embodiment, the link may pass through the CPU operating system, but the security end point may be the secure engine logic so the CPU only sees encrypted data routing through it.

The second device includes a processing arrangement for communicating with the first device and, specifically, the secure engine logic 15 for establishing the secure communications link. The second device has an architecture specific to this device which may or may not be different from the processing architecture of the first device. For example, while many of the operations for initiating the secure communications link are performed outside the CPU operating system of the first device, the CPU operating system of the second device may manage establishment of the link in the second device.

For illustrative purposes, the second device in FIG. 2 has been shown to include a CPU operating system 21 and a hardware platform 22 for exchanging security information with the hardware platform in the first device. The CPU operating system may perform functions required during a secured session with the first device.

The hardware platform 22 may include secure engine logic 23 which exchanges identification and security information with the hardware platform of the first device along a signal path that bypasses CPU operating system 21. The hardware platform of the second device also includes a storage area 24 for storing the security information for establishing secure communications with the first device. This information may include any of the types previously mentioned as well as password or other forms of identification information for the second device.

In this embodiment, secure engine logic 23 and storage area 24 do not store, process or exchange identification information for the first device. Rather, this embodiment is one-directional serving to secure only access to and data, files and other information stored in the second device. In this regard, the second device may be considered to be a secured or trusted device.

The second device also includes a graphics engine 25 and (or is coupled to) a display 26. The graphics engine generates a graphical user interface for outputting information to the display. In the context of the present embodiment, the graphics engine receives identification information (e.g., a personal identification number (PIN), password, or other access information) for the second device from the storage area 24 and then outputs this information in a predetermined window or screen of the display 26 for viewing by a user. The identification information may be transferred from the secure engine logic/storage area to the graphics engine without passing through the CPU operating system. As a result, malicious code (e.g., viruses, malware, Trojans, etc.) in the operating system will not be able to change the data to be transferred after the pairing operation is performed.

In one illustrative case, the second device has a PIN number of 1234 which will be entered into the first device. The user of the second device may verify that the same PIN is being displayed that was entered on the first device before approving the pairing.

Figure 3:
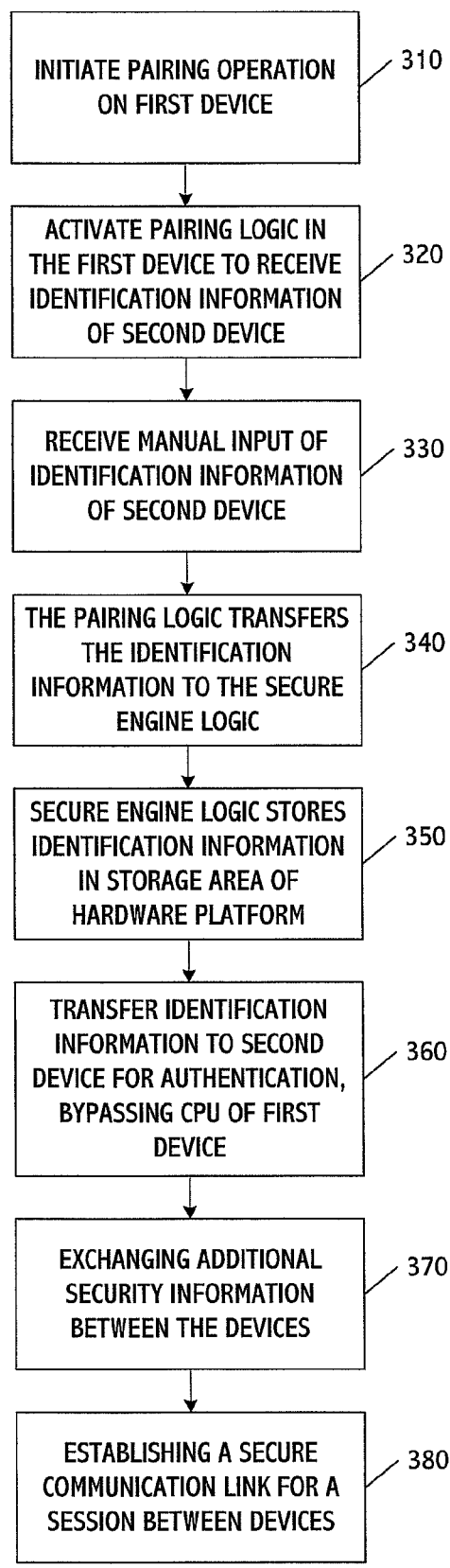
FIG. 3 shows another method for establishing a secure link between two devices.

FIG. 3 shows operations in one embodiment of a method for establishing this secure communication. While the method may be performed by the apparatus of FIG. 2, a different apparatus may be used to perform the method in other embodiments.

The method may be performed in three stages: Initial Pairing Operation, Secure Session Management, and Automatic Pairing Operation. These stages may be successively performed to provide secure communications between the devices with enhanced protection against viruses and prevention of unauthorized access of data in the trusted or secured (second) device.

The Initial Pairing Operation includes initiating a pairing function on the first device 10. (Block 310). This function may be initiated, for example, by selecting a menu item or icon on a screen of a display of the first device, by pressing a specific key or button, and/or by receiving a signal from the second device to establish a connection with the second device. Initiation of the pairing function may cause the screen to application having an entry window of a predetermined format to receive the identification information. An example of a display of the first device is shown by reference numeral 26 in FIG. 2.

At the time of initiation of the pairing function, the first logic 12 in the CPU operating system of the first device is placed in a state ready to receive the identification information of the second device. (Block 320). As indicated, the pairing function may be implemented, for example, by the CPU operating system software or some other type of software agent.

After the pairing function has been initiated, the entry window displayed on the screen of the first device receives the identification information of the second device. The identification may be manually entered into the window by a user of the first device using a keyboard or other input device. (Block 330). In the example shown in FIG. 2, the identification information includes a PIN number of the second device which is conveyed to the user of the first device (conceptually shown by arrow 40). In other embodiments, a different type of identification information may be entered.

For example, the secure engine logic of the second device may generate a random PIN or other identification information for display on its screen. This random PIN may be sent to the first device using secure connection. The user of the first device may type the PIN on a keyboard, and the secure engine logic of the first device may compare the PIN the user entered to the PIN of the second device that was received. The pairing process may be considered to be successful only if the PINS match. At this point, the secure session can start to exchange data that can be used later for automatic pairing and usage between the devices.

The identification information may be obtained by a user of the second device by the user of the second device informing the user of the first device. The first device user may be informed of this information, for example, verbally over the phone or in person, by e-mail, by text message or by another method.

Once received, the first logic 12 transfers the identification information to the second engine logic 14 in the hardware platform 14 of the first device through signal line(s) 13. (Block 340). The secure engine logic then stores the identification information in storage area 16 for use in communicating with the second device. (Block 350).

In a next operation, the secure engine logic establishes a link with the second device based on the identification information of the second device stored in the storage area 16 of the first device. This involves transferring the identification information to the second device for authentication. Authentication may be accomplished as a result of the secure engine logic 23 in the second device comparing the identification information received from the first device to stored identification information in the second device. If a match occurs, authentication is confirmed. The identification information may be transferred along a path that bypasses the CPU operating system of the first device, such as over link 31 in FIG. 2. (Block 360).

After the identification information is authenticated by the second device, a next operation includes exchanging additional security information between the devices. (Block 370). This operation is included in implementing secure session management. The additional security information may be transferred between the secure engine logic of the first and second devices through link 31, or another link, and may include public or private keys, certificates, or any of the other forms of additional security information previously discussed.

The exchange of additional security information may be performed bi-directionally, e.g., the secure engine logic of the first device may send one or more keys to the secure engine logic of the second device for storage and the secure engine logic of the second device may send one or more keys of the second device to the first device for storage. By exchanging and storing this information in respective ones of the devices, the automatic pairing function previously alluded to may be performed.

After the additional security information has been exchanged and stored, a secure communication link may be established between the devices. (Block 380). The policy information in respective ones of the devices may then be updated to indicate that a trusted relationship now exists between the devices, as a further measure for supporting automatic pairing between them. The secure communication link may be established between the CPU operating systems of the devices, as illustratively shown by reference numeral 32 in FIG. 2. Unlike link 31, communications link 32 passes through the CPU operating systems.

These respective operating systems may communicate through the secure link to allow the first device to access data, applications, files and/or other information stored within the second device. For example, according to one illustrative scenario, the personal computer corresponding to the first device may access data, photos, video, documents, applications and/or other information from a tablet serving as the second device. Additionally, or alternatively, a user of the first device may be able to use an application resident on the second device through an appropriate user interface on the display of the first device. The CPU operating systems of these devices may communicate with the secure engine logic 15 and 23, as needed, to effect transfer, exchange or access of information or applications between the devices.

Figure 4:
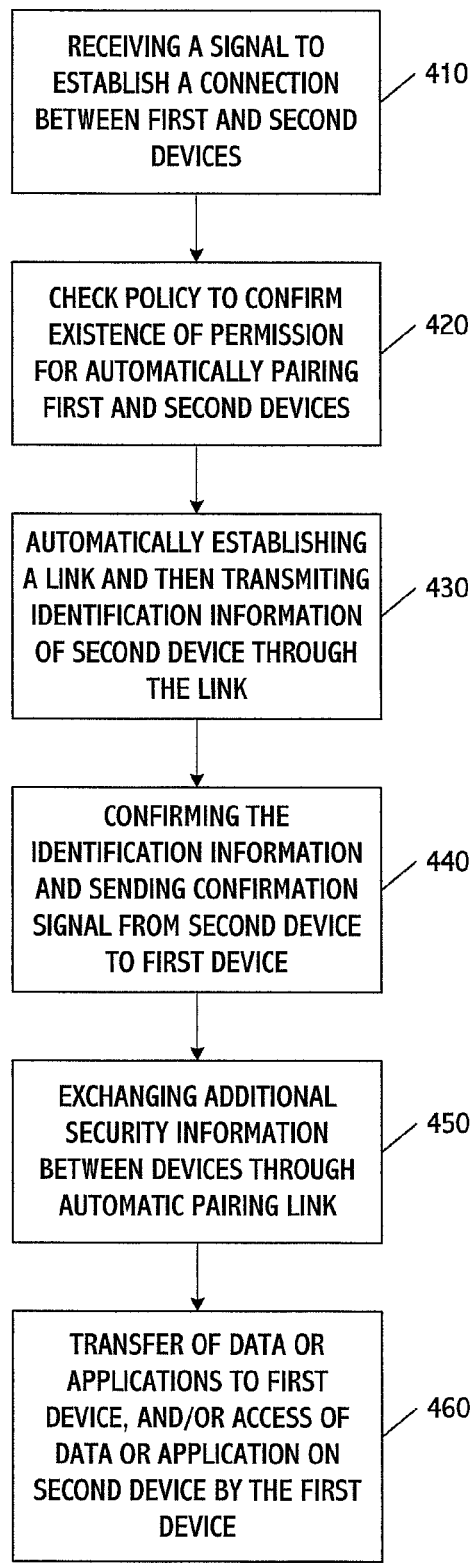
FIG. 4 shows one embodiment of an automatic pairing operation.

FIG. 4 shows one embodiment of the automatic pairing operation, which may be performed at a subsequent time after the secure communications session and/or data transfer is terminated. The automatic pairing operation may begin with receiving a request signal to establish a connection between the first and second devices. (Block 410). The request signal may be received by either device, for example, through selection of a menu item or other interface screen, activation of a predetermined button, or use of another input device or signal-input method. The request signal may also be automatically triggered by a discovery or synch operation performed between the devices resulting, for example, from being connected on a same network or as a result of a proximity identification by wireless technology, e.g., WiFi, Bluetooth, etc. For illustrative purposes, it will be assumed in the following discussion that the first device receives the request signal through use of an input device 30, which, for example, may be a touch display or keypad.

In response to the request signal, the secure engine logic in the hardware platform of the first device checks stored policy information to determine whether permissions or other authorizations exist for automatically pairing the first and second devices. (Block 420). At this point of the method, these permissions or authorizations exist in the first device as a result of the initial pairing operation previously explained.

Once confirmation has been received that the devices have been initially paired, a next operation involves the secure engine logic 15 establishing a link to the second device and then transmitting the identification of the second device to the secure engine logic 23 through the link. (Block 430). The automatic pairing link is conceptually shown by reference numeral 33 in FIG. 2. Unlike during this initial pairing operation (which requires manual input of the identification information of the second device by a user of the first device), the operation in Block 430 is automatically performed as a result of prior completion of the initial pairing operation.

Once received, the second device authenticates the identification information and sends a confirmation signal back through the link. (Block 440). The secure engine logic 15 of the first device responds by sending the additional security information (stored within the first device) through the link, after which the secure engine logic 23 of the second device reciprocates with additional security information to establish the secure connection between the devices. (Block 450).

Access to data, files, applications and/or other information stored in the second device by the first device is then possible through the CPU operating systems of the devices. The transfer of this information may take place through link 32 and the processing of this information may or may not involve use of the secure engine logic of one or more of the devices. Additionally, or alternatively, the data, files, applications or other information stored in the second device may be accessed by the first device based on the secure communications link established by automatic pairing of the devices. (Block 460).

As a result of the master-slave relationship formed by this method embodiment, the trust level established may dictate what applications or information may be subject to transfer from the secure (master) device 20 to the non-secure (slave) device 10. Also, in this relationship, the more secure device 20 may show information or content from the less-secure device 10, but the less-secure device may not be permitted to show content or information from the more secure device. In this way, the less-secure device may serve as an input device to the more-secure device.

Figure 5:
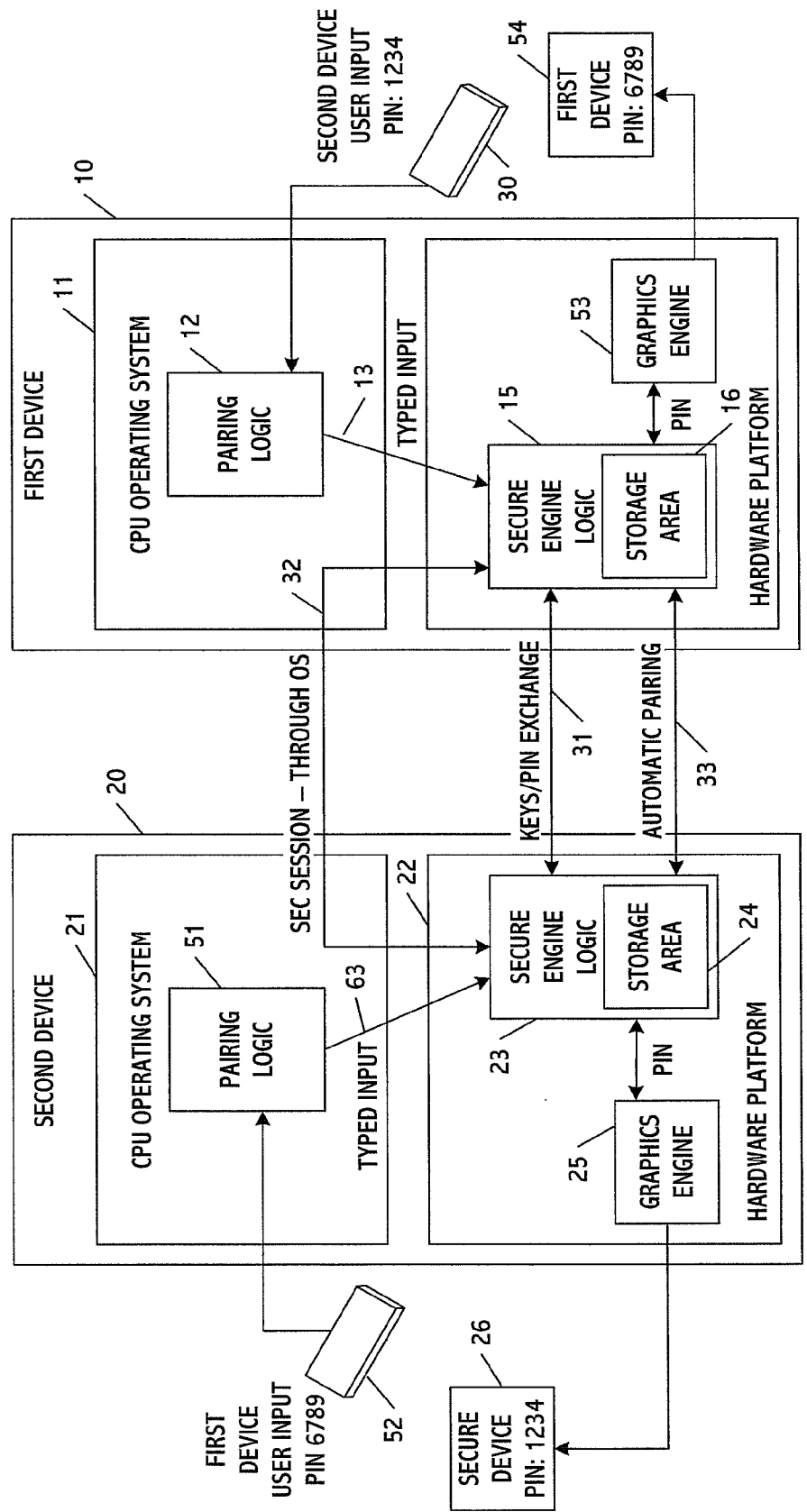
FIG. 5 shows a system for establishing a secure link between two devices.

FIG. 5 shows one embodiment of a system for establishing a secure link between two devices. This system differs from FIG. 2 in that the identification each device is input into the other device for establishing bidirectional secure communications between the devices. Thus, in this system, both devices are considered to be secure trusted devices.

In the system, the first device may have many of the same features of the first device shown in FIG. 2. The second device may also have many of the same features. However, in order to achieve bidirectional secure communications, several additional features may be added.

In the second device, a first logic 51 and an input device 52 are shown. The input device may be any type of device, e.g., may be the same or different from the input device 30. In one implementation, input device 52 is a touch display which includes an application window containing an input field for receiving identification information of the first device. The identification information for the first device is illustratively shown as a PIN 6789, which may be manually input by a user of the second device or input based on any of the aforementioned methods discussed relative to the first device.

The first logic receives the identification information of the first device and sends this information to secure engine logic 23 through signal line 63 for storage in storage area 24. This information will be used to establish an initial secure link to the first device during the initial pairing operation. As shown, the first logic may be included in the CPU operating system software of the second device or may be located in the hardware platform or in another circuit in other embodiments.

In the first device, graphics engine 53 and display 54 are included. The graphics engine may be the same or different from graphics engine 25 and operates to output information from the secure engine logic 15 for display by a user of the first device. The information output by the graphics engine may be in association with an application window and includes identification information of the first device, such as, for example, PIN 6789. The identification information is output on display 54 for viewing by a user, so that a user of the second device can be informed of this information for input into the second device through device 52. While input device 30 and display 54 are shown to be separate devices, according to one embodiment these devices may be the same (e.g., a display with a touch screen), and the same is true with display 26 and input device 52.

Figure 6:
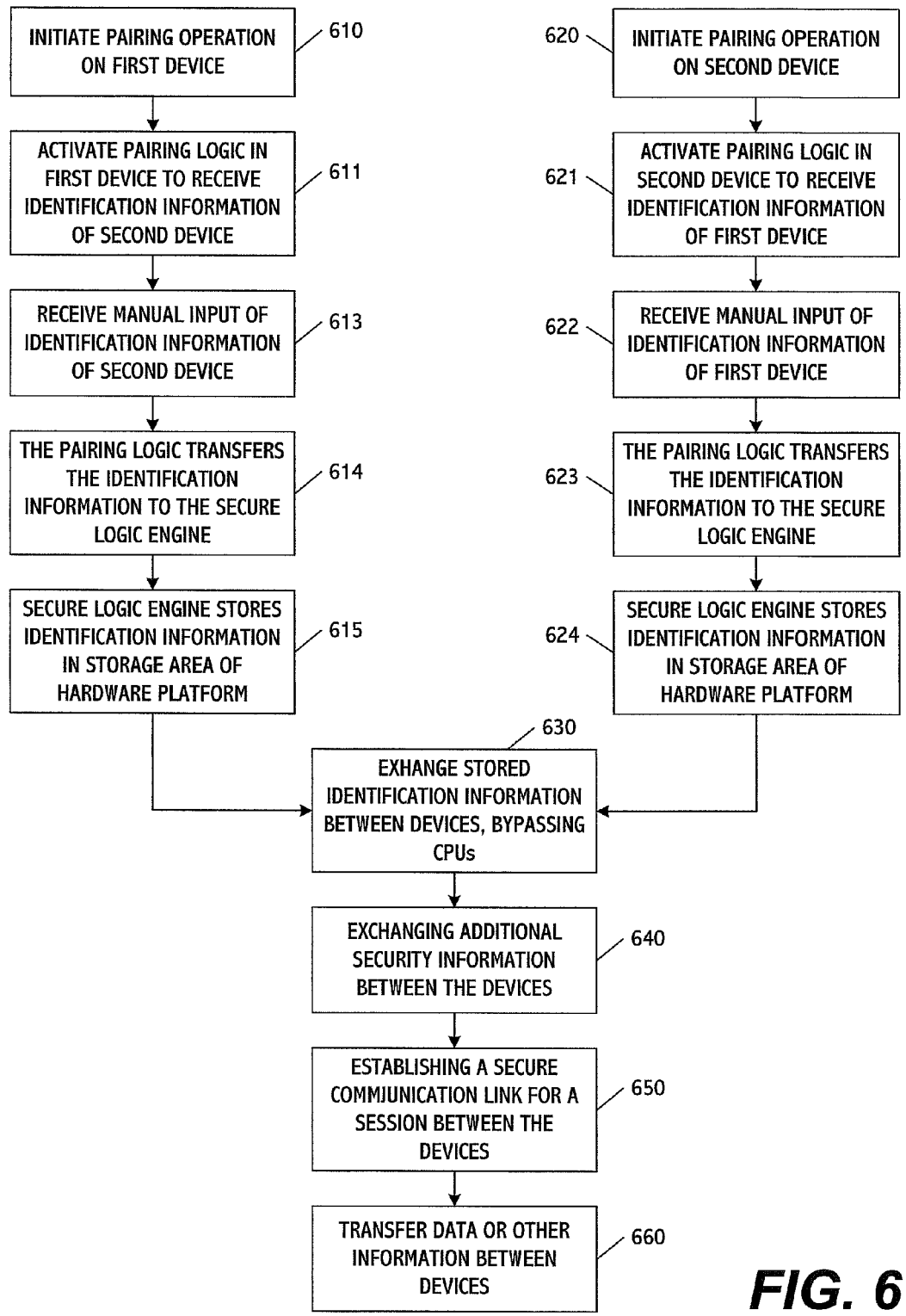
FIG. 6 shows another method for establishing a secure link between two devices.

FIG. 6 shows operations performed in another embodiment of a method for establishing this secure communications between two devices. The method may be similar and share many of the same operations in FIG. 3; however, additional operations are included to establish secure bidirectional communications between the devices, e.g., to establish both devices as trusted and secure devices.

Like the method of FIG. 3, the method of FIG. 6 may be performed in three stages: Initial Pairing Operation, Secure Session Management, and Automatic Pairing Operation. These stages may be successively performed to provide secure communications between the devices with enhanced protection against corruption by viruses and prevention of unauthorized access of data in the trusted or secured devices.

The Initial Pairing Operations may be similarly performed in both devices. In the first device, the operations corresponding to Blocks 610 to Block 615 may be the same or similar to Blocks 310 to Block 350 in FIG. 3. A companion set of operations may be performed in the second device during the initial pairing operation.

For example, an initial operation may include initiating a pairing operation on the second device. (Block 620). This operation may be initiated, for example, by selecting a menu item or icon on a screen of a display of the first device, by pressing a specific key or button, and/or by receiving a signal from the second device to establish a connection with the second device. Initiation of the pairing operation may cause the screen to display an application having an entry window of a predetermined format to receive the identification information. An example of a display of the first device is shown by reference numeral 26.

At the time of initiation of the pairing operation, the first logic 51 in the CPU operating system of the second device is placed in a state ready to receive the identification information of the first device. (Block 621). As indicated, the pairing operation may be implemented, for example, by the CPU operating system software or some other type of software agent.

After the pairing operation has been initiated, the entry window displayed on the screen of the second device receives the identification information of the first device. The identification may be manually entered into the window on a display screen 52 by a user of the second device using a keyboard or other input device. (Block 622). In the example shown in FIG. 5, the identification information includes a PIN (6789) number of the first device which is conveyed to the user of the second device. In other embodiments, a different type of identification information may be entered.

The identification information may be obtained by a user of the first device by the user of the first device informing the user of the first device. The user of the first device may obtain this identification information on an application screen of its display 54 after, for example, the pairing operation has been initiated on the first device. The second device user may be informed of the identification information of the first device, for example, verbally over the phone or in person, by e-mail, by text message or by another method.

Once-received, the first logic 51 transfers the identification information of the first device to the secure engine logic 23 in the hardware platform 22 through signal line(s) 63. (Block 623). The secure engine logic then stores the identification information in storage area 24 for use in communicating with the first device. (Block 624).

The operations corresponding to Blocks 610 to 615 may be performed in the first device concurrently with the operations corresponding to Blocks 620 to 624 in the second device, or these operations may be performed at different times, for example, as a result of the user of one device initiating the initial pairing operation before or after the user of the other device initiates the initial pairing operation.

Once the initial pairing operations have been completed in both devices, a next operation involves secure engine logics 15 and 23 cooperating with one another to establish a link between the devices. This cooperation may involve, for example, executing an application to sync or otherwise establish a short range channel between the devices. The short-range link may be, for example, a Bluetooth link, a WiDi link, or some other type of link. Alternatively, the link may be established through a network such as a mobile communications network or the Internet. Wired links are also possible, for example, through a USB cable or other type of hard-wired interface connection.

Once the link has been established, the identification information in storage areas 16 and 24 are exchanged over the link. The link may correspond to reference numeral 31 as an example. More specifically, secure engine logic 15 may transmit the identification information of the second device to the second device over the link, and secure engine logic 23 may transmit the identification information of the first device to the first device over the link. (Block 630).

After this information has been exchanged, the identification information received by each device is authenticated, for example, by comparing the received identification information (e.g., PIN) with a stored PIN of that device. Authentication may be performed by the secure engine logic of each device or another processor. If a match occurs, authentication is confirmed.

After the identification information is authenticated in each device, a next operation includes exchanging additional security information between the devices. (Block 640). This operation is included in implementing secure session management. The additional security information may be transferred between the secure engine logic of the first and second devices through link 31, or another link, and may include public or private keys, certificates, or any of the other forms of additional security information previously discussed. By exchanging and storing this information in respective ones of the devices, the automatic pairing function may be performed later.

After the additional security information has been exchanged and stored, a secure communication link may be considered to be established between the devices. (Block 650). The policy information in respective ones of the devices may then be updated to indicate that a trusted relationship now exists between the devices, as a further measure for supporting automatic pairing between them. The secure communication link may be established between the CPU operating systems of the devices, as illustratively shown by reference numeral 32 in FIG. 2. Unlike link 31, communications link 32 passes through the CPU operating systems.

The operating systems of the devices may communicate through the secure link to allow the first device to access data, applications, files and/or other information stored within the second device. (Block 660).

In accordance with any of the foregoing embodiments, the secure communications link established between the devices (either bi-directionally or uni-directionally) may have any of a variety of formats. For example, the secure communications link may be a Protected Audio Video Path (PAVP), which may operate to protect link during video playback from one device to another. In one embodiment, PAVP software implemented by the secure engine logic may perform video decoding to reduce CPU processor load. Alternatively, PAVP software may be configured in the device Basic Input/Output System (BIOS).

The secure communication link may also transfer dated based on a "move" (MV) command, which, for example, may be a Uniplexed Information and Computing System (UNIX) command implemented to move one or more files, directories, content or other information from one device to another over the link.

Also, the secure storage of information in the devices may conform to various standards. In one embodiment, the identification and/or additional security information in storage areas 16 and 24 may conform to a Path Environment Audit Tool (PEAT) format.

In accordance with one or more of these embodiments, use of the platform hardware in one device to perform an autonomous exchange of data with the hardware platform in the other device prevents malware or viruses or other contaminations from corrupting the established secure communications link. This is because viruses cannot simulate the platform hardware in establishing the secure communications because this hardware is implemented outside the CPU operating system.

Also, the ability of the platform hardware to interact with a user without operating system involvement (e.g., to enable secure output and input of information) adds an additional layer of security which cannot be simulated by viruses, for purposes of establishing and transferring data securely between the devices. This security also lends an added measure of protection in exchanging keys and additional security information between the devices.

Also, storing the keys, identification information, and other security information off-chip or external to the CPU operating system environment adds an extra layer of security in protecting data communications between the devices. While FIGS. 2 and 5 show a link 32 which passes through the operating systems of the devices, during the initial pairing operation and/or the secure session management stage, the identification and additional security information may not pass through the CPU operating systems but rather may bypass these systems or routed in encrypted form through the CPU operating system, for example, through one or more of links 31 and 32.

Through one or more of the embodiments described herein, a first device is able to access data, files, or documents or perform applications resident on a second device under conditions where the data, files, documents or applications are not natively supported by or are otherwise not permitted for use by the first device. An example of a particular embodiment will now be discussed.

Once the automatic pairing operation has been performed and a trust relationship has been established between two devices, the security capabilities and identifies between the devices may be extended, e.g., the security permissions and capabilities of one device may be extended to the other device. This may take place under a unidirectional or bi-directional security scenario.

The first device is a secure device such as an Intel vPro machine that supports security capabilities such as one or more of secure enclave support, secure certificate store— PEAT, PAVP, Media Vault (e.g., Intel Insider), and/or other similar capabilities. PEAT may correspond to Intel Protection Technology (IPT) embedded public key infrastructure (PKI) standard. The second device may the same device, a device having equal security, or a less secure device such as a tablet without PEAT. The less-secure device may still have some secure capabilities which, for example, may be a subset of some of the capabilities on the first device.

Examples of some of the capabilities of the less-secure device may include a capability to provide a secure communications channel directly between hardware resources on the two devices based on, for example, real-time or prior trust establishment (e.g., secure pairing). Another capability may correspond to a hardware solution to securely present content without software ability to access content.

In one implementation, the less-secure device may request or otherwise expose security capabilities of the more secure device through the aforementioned connections. For example, a user of the less-secure device (e.g., tablet without PEAT) may be able to authenticate to a website or application that requires a certificate based on the authentication and certificate of the more secure device (e.g., Intel vPro device).

Another implementation may involve allowing the less-secure device to view or otherwise access content protected on the more-secure device using PAVP/Media Vault of the more-secure device. Although the less-secure device (e.g., tablet) cannot be trusted to actually host the sensitive content, that content can be made accessed by the less-secure device. Such a scenario may involve, for example, "Intelinsider between devices" without backend server involvement.

An even more specific example of this implementation contemplates the ability to provide a PEAT-created one-time pad on a tablet generated on an Intel vPro machine. That one-time pad can be used on the tablet without the secured pad generation ability on the tablet. The existence of PAVP on the tablet is enough to provide the one-time pad even though the tablet has no native capabilities to generate such a pad. Such an implementation may also contemplate the ability of the less-secure device to access premium content on the more-secure device under circumstances where the less-secure device supports only secure video display (PAVP) but not secure content storage.

Figure 7:
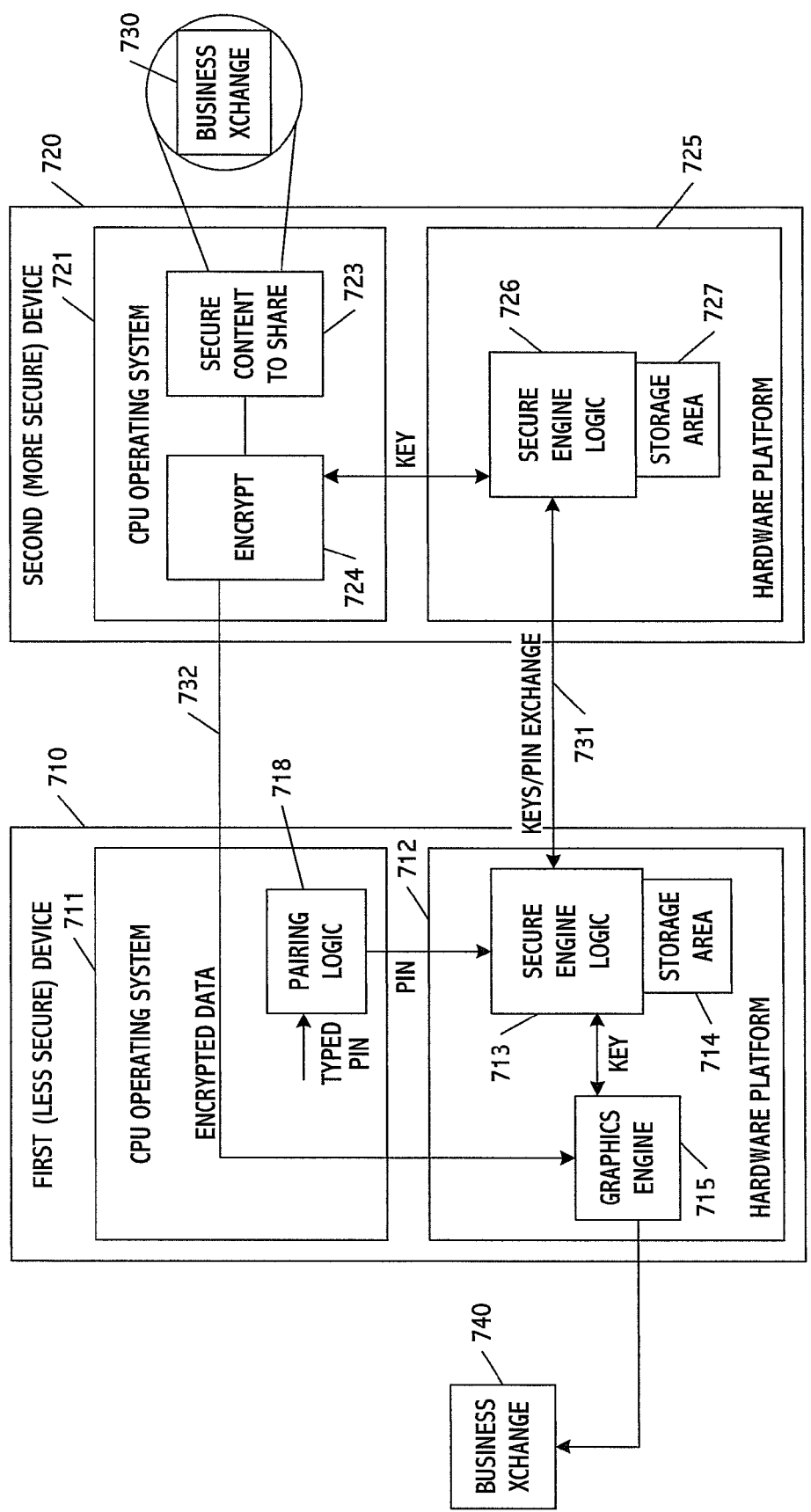
FIG. 7 shows another system for establishing a secure link between two devices.

FIG. 7 shows another embodiment of a system for establishing a secure link between two devices. The system includes a first device 710 and a second device 720. The first device is a less-secure and/or less capable device which is to receive access to protected or secure content, to a protected or secure website or network, and/or to an application resident on a second device 720 which is a more secure and/or more capable device. In another embodiment, the first may not be any less capable or secure than the second device, but the second device may have access to files, content, applications, or websites that the first device does have access to.

The first device 710 includes a CPU operating system 711 and a hardware platform 712. The CPU operating system may include first logic 718 which is to receive a PIN and/or other identification information of the second device. This information may be manually input by a user of the first device as explained in other embodiments. Once received, the first logic may input the identification information of the second device to the hardware platform.

The hardware platform 714 includes secure engine logic 713, a storage area 714, and a graphics engine 715. The secure engine logic may communicate with the second device over channel 731 during an initial pairing operation, secure session management, and/or data exchange as described in other embodiments. The storage area may be within or coupled to the secure engine logic, and the graphics engine may output an interface or other screen on a display 740 for receiving the identification information of the second device, for displaying the secure content, application or website through the second device, and/or to display other information.

More specifically, the storage area may store a PIN of the second device, and the graphics engine may generate a graphical user interface for allowing a user of the first device to enter the identification information of the second device as well as to output secure content, an application, or website, etc., based on the security credentials of the second device. In the example shown, the first device is to access a secured website corresponding to an e-commerce application (e.g., Business Xchange) based on the security credentials of the second device. In this implementation, the first device would not be able to receive access to this website if it were not for the security credentials of the second device, because of the less-secure or less-capable features of the first device.

The second device 720 includes a CPU operating system 721 which includes a memory 723 to store secure content to be shared with or otherwise to be accessed by the first device and a processor 724 for encrypting the content in memory 723 The processor 724 provides an extra level of security in providing the first device with access to the secured content and may correspond to the CPU of the first device. A display 730 may output a PIN or other identification information to be conveyed to a user of the first device for manual input into the first device during initial pairing. After the initial pairing operation, subsequent pairing may be automatically performed as described in relation to other embodiments.

The second device also has a hardware platform 725 that includes secure engine logic 726 and storage area 727. These features may operate as in other embodiments, e.g., the secure engine logic may exchange information with the first device during an initial pairing operation, session management, and subsequent data exchange. The data to be exchanged may include the secure content to be shared as stored in memory 723, which is subject to encryption by processor 724. The encrypted content may be sent to the first device over a protected channel 732, which, for example, may pass through the CPU operating system of the first device.

While the embodiment of FIG. 7 has been explained as having the PIN information manually entered, in other embodiments the PIN or identification information may be entered, for example, by establishment of a cookie or other automatic or processing techniques.

In accordance with another embodiment, a computer-readable medium stores instructions to control access of information from one device to another device. The medium may be a memory or other type of storage area located in or coupled to one or more devices. The instructions may include code to execute operations corresponding to any of the methods described herein.

In one particular implementation, the instructions include first code to receive identification information of a second device in a first device, second code to store the identification information in the first device in a storage area accessible by logic of the first device, third code to provide the identification information to the second device during an initial pairing operation, and fourth code to automatically pair the first and second devices after the initial pairing based on the stored identification information, wherein the identification information of the second device is input into the first device based on a manual input operation, wherein the logic of the first device is different from a central processing unit (CPU) of the first device and wherein the first device receives content from the second device after the automatic pairing.

The content may be at least one of a file, data, application, or a network site which is permitted for access by the second device and which is not permitted for access by the first device except through the second device. The identification information of the second device may be sent to the first device along a signal path that bypasses a processor of the first device.

The instructions (e.g., program) may also include code to receive the identification information in an input window displayed on a screen of the first device, wherein the input window is to receive the identification information as a result of a typing operation. Also, code may be included to exchange security information between the first and second devices during a session, wherein the session is to occur after initial pairing between the first and second devices.

The security information may include at least one key of the first device and at least one key of the second device, and the identification information of the second device may include a personal identification number or password of the second device. Also, code may be included to update policy or session management information in the first device to allow for automatically pairing of the first and second devices after the initial pairing, and to output the content on a display coupled to the first device.

Additional code may include code to receive identification information of first device from the second device, and code to authorize a trust relationship for secure communications for sending content stored in the first device to the second device after the automatic pairing operation.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus for a first device, comprising:
first logic, located within or implemented by a processor, to receive identification information of a second device;
a signal path to be coupled to an input device;
a hardware platform having a storage area to store the identification information to be received from the first logic; and
second logic to provide the identification information to the second device to establish an initial pairing between the first device and the second device, wherein the first logic is to receive the identification information of the second device based on a manual input operation to be performed for the first device, the manual input operation to include receiving the identification information based on manual input of the identification information on the input device, and wherein the second logic is to provide the identification information, to the second device, across a first link that is to bypass the processor operating system of the first device and to automatically pair the first device and the second device after the initial pairing based on the identification information in the storage area, and the processor of the first device to receive content from the second device across a second link that is to pass to the processor operating system after the automatic pairing of the first device and the second device, and the second logic is to provide the identification information of the second device to the first device along a signal path that is to bypass a processor of the first device.

2. The apparatus of claim 1, wherein the processor to receive content from the second device after the automatic pairing of the first device and the second device,
wherein the content is to be output on a display of the first device.

3. The apparatus of claim 2, wherein the content is to be at least one of a file, data, application, or a network site which is to be permitted for access by the second device and which is not to be permitted for access by the first device except through the second device.

4. The apparatus of claim 1, wherein the second logic is to exchange security information with the second device during a session and wherein the session is to occur after initial pairing between the first device and the second device.

5. The apparatus of claim 4, wherein the security information is to include at least one key of the first device and at least one key of the second device.

6. The apparatus of claim 1, wherein the identification information of the second device is to include a personal identification number or password of the second device.

7. The apparatus of claim 1, wherein the second logic or a processor is to update policy or session management information to automatically pair the first device and the second device after initial pairing.

8. The apparatus of claim 1, wherein the first device is one of a smart phone, a notebook computer, or another type of portable electronic device equipped with a wireless or wired communication circuit.

9. A non-transitory computer-readable medium storing instructions to control access of information, the instructions including:
   first code to receive identification information of a second device in a first device, the identification information of the second device to be sent to the first device along a signal path that bypasses a processor of the first device;
   second code to store the identification information in the first device in a storage area accessible by logic of the first device;
   third code to provide the identification information to the second device during an initial pairing operation, the third code to provide the identification information to the second device across a link that is to bypass an operating system of the processor of the first device; and
   fourth code to automatically pair the first device and the second device after the initial pairing based on the stored identification information, wherein the identification information of the second device is input into the first device based on a manual input operation, the manual input operation is to include receiving the identification information based on manual input of the identification information, wherein the logic of the first device is different from the processor of the first device and wherein the processor of the first device to receive content from the second device across a secured link that is to pass to the processor operating system after the automatic pairing of the first device and the second device.

10. The medium of claim 9, wherein the content is at least one of a file, data, application, or a network site which is permitted for access by the second device and which is not permitted for access by the first device except through the second device.

11. The medium of claim 9, further comprising:
    code to receive the identification information in an input window displayed on a screen of the first device, wherein the input window is to receive the identification information as a result of a typing operation.

12. The medium of claim 9, further comprising:
    code to exchange security information between the first device and the second device during a session, wherein the session is to occur after initial pairing between the first device and the second device.

13. The medium of claim 12, wherein the security information includes at least one key of the first device and at least one key of the second device.

14. The medium of claim 9, wherein the identification information of the second device includes a personal identification number or password of the second device.

15. The medium of claim 9, further comprising:
    code to update policy or session management information in the first device to allow for automatically pairing of the first device and the second device after the initial pairing.

16. The medium of claim 9, further comprising:
    code to output the content on a display coupled to the first device.

17. The medium of claim 9, further comprising:
    code to receive identification information of the first device from the second device, and
    code to authorize a trust relationship for secure communications for sending content stored in the first device to the second device after the automatic pairing operation.

18. The apparatus of claim 1, wherein the identification information is to allow the first device to have secured access to the second device.

19. The apparatus of claim 18, wherein the identification information is to allow the first device to have one or more security capabilities of the second device.

20. The apparatus of claim 19, wherein the first device has less than all the security capabilities of the second device.

* * * * *